(12) United States Patent
Baweja et al.

(10) Patent No.: US 6,564,229 B1
(45) Date of Patent: May 13, 2003

(54) SYSTEM AND METHOD FOR PAUSING AND RESUMING MOVE/COPY OPERATIONS

(75) Inventors: Baljeet Singh Baweja, Austin, TX (US); Kulvir Singh Bhogal, Austin, TX (US); Nizamudeen Ishmael, Jr., Austin, TX (US); Mandeep Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/589,794

(22) Filed: Jun. 8, 2000

(51) Int. Cl.⁷ .............................................. G06F 17/00
(52) U.S. Cl. ..................... 707/200; 707/104.1; 345/961
(58) Field of Search ....................... 707/200, 10, 104.1; 709/200, 237; 345/961

(56) References Cited

U.S. PATENT DOCUMENTS

| | | | | |
|---|---|---|---|---|
| 5,036,361 A | * | 7/1991 | Filion et al. ................... 399/81 |
| 5,377,345 A | * | 12/1994 | Chang et al. ................ 711/118 |
| 5,583,537 A | * | 12/1996 | Cocchiaro et al. ........... 345/115 |
| 5,584,039 A | * | 12/1996 | Johnson et al. ................. 710/6 |
| 5,590,273 A | * | 12/1996 | Balbinot ......................... 714/3 |
| 5,654,747 A | * | 8/1997 | Ottesen et al. ................ 348/12 |
| 5,734,589 A | * | 3/1998 | Kostreski et al. ........... 345/327 |
| 5,751,719 A | | 5/1998 | Chen et al. .................. 370/473 |
| 5,754,784 A | * | 5/1998 | Garland et al. .............. 709/219 |
| 5,790,753 A | * | 8/1998 | Krishnamoorthy et al. . 709/203 |
| 5,793,983 A | * | 8/1998 | Albert et al. ................ 709/239 |
| 5,815,722 A | | 9/1998 | Kalwitz et al. .............. 395/712 |
| 5,841,979 A | * | 11/1998 | Schulhof et al. ............. 709/237 |
| 5,914,941 A | * | 6/1999 | Janky .......................... 370/313 |
| 5,943,480 A | | 8/1999 | Neidhart ................. 395/200.56 |
| 5,987,505 A | | 11/1999 | Fry et al. ..................... 709/208 |
| 6,012,159 A | | 1/2000 | Fischer et al. ............... 714/755 |
| 6,401,239 B1 | * | 6/2002 | Miron .......................... 717/11 |
| 6,453,316 B1 | * | 9/2002 | Karibe et al. .................. 707/8 |
| 6,469,796 B1 | * | 10/2002 | Leiman et al. ............. 358/1.15 |

FOREIGN PATENT DOCUMENTS

EP          0 862 304 A2      2/1998   ........... H04L/29/06

OTHER PUBLICATIONS

Lu et al "A Synchronization Scheme for Distributed Multimedia Information Systems", IEEE 1992, pp. 1–5.*

* cited by examiner

Primary Examiner—Frantz Coby
Assistant Examiner—Uyen Le
(74) Attorney, Agent, or Firm—Joseph T. Van Leeuwen; Jeffrey S. LaBaw

(57) ABSTRACT

A move/copy interface is provided with a pause feature that allows the user to pause and subsequently resume a move or copy command. In one embodiment, the pause, tool saves an index, source file name, target file name, block size and block number so that the operation can be subsequently resumed. After a pause has been requested, a "resume" command button appears on the, user interface that is selected by the user to resume processing. Extended periods between a pause and subsequent resume are provided by saving the pause data to a data file. Another embodiment pauses a copy operation over a computer network, such as the Internet, suspending the source computer's sending of blocks of data comprising the source file until the resume operation is requested. The user can repeatedly pause and resume the copy operation in order to free system resources in order to perform other operations.

19 Claims, 8 Drawing Sheets

SYSTEM AND METHOD FOR PAUSING AND RESUMING MOVE/COPY OPERATIONS

BACKGROUND OF THE INVENTION

1. Technical Field

The present invention relates in general to a method and system for data processing and in particular to an improved method and system of moving or copying data within a data, processing system. Still more particularly, the present invention relates to an improved method and system for pausing move or copy operations in order to provide computing resources to other system operations.

2. Description of the Related Art

Within data processing systems, common tasks include moving and copying data from one file to another. Moving a file includes copying the source file to a new location and then erasing the source file when the copying is completed. In the lexicon of this invention, the term "copy" (and derivatives thereof) is used herein to include the concept of moving files since moving files simply involves a copy operation followed by erasing the source file used during the copy operation.

As systems grow in complexity, files that need to be copied often become larger and larger. Files often include graphics, audio data, large executables, and multimedia files. Copying these files from one location to another requires substantial computer resources. These resources include hard disk space, memory, processors, and network resources. When one task, such as a large move or copy operation, utilizes substantial computing resources, few resources remain for other computer operations. Other operations may then become extremely slow or stall because they are not receiving the resources necessary for proper execution.

With the increased popularity of computer networks, including the Internet, users often want to copy files from one computer system to another. In order to copy files from one computer system to another, data from the source data file is transmitted across the network to the target computer system and stored in a file on the target computer system. Copying files between computer systems using a computer network involves even more resources, including network interfaces and Internet service provider (ISP) computer systems. Programs that copy files, such as may exist in a web page, from a server to a client computer over the Internet often allow the user to stop the operation. When the copy is resumed, the web browser compares the files needed to be copied with a memory cache on the user's computer. However, files that are incomplete are often fully re-transmitted from the server computer. In addition, the cache must first be searched for files, or portions of files, that were previously transmitted before the copy operation can resume.

The available resources in a typical data processing system must be distributed among various processes being executed by the computer system. Copying large data files can be a very system intensive task using a large amount of system resources. While a copy operation is taking place, other system processes may become "starved" for computer resources and may appear to halt or otherwise slow down. A user may want another task to complete quickly, but a currently executing copy operation may render this impossible. The copy process maybe copying a file that is not time critical (i.e. the user does not need the move/copy process to complete immediately), and thus the user's time-critical task is waiting for a less time-critical copy operation to complete.

One possible solution is that, the user cancel the copy operation. However, by canceling the copy operation, the data that has already been copied would have to be recopied when the copy operation is re-invoked by the user. A challenge in the prior art is temporarily suspending the copy operation without canceling the copy operation and without having to re-copy the entire source file at a later time.

SUMMARY

It has been determined that a move or copy command can be improved by providing a pause button for the user from the move/copy screen. When the user selects the pause button, the copy operation is suspended. Information regarding the copy operation is retained so that the operation can be resumed at a later time. In one embodiment, the source file is partitioned into blocks of data. When the pause button is pressed, an index is stored which points to the next block of data in the source file to be copied. When resume processing is requested by the user, the index is read and, processing commences at the next block in the source file (i.e. the block following the last block that was copied before the pause command button was selected). In another embodiment, information regarding the source file name, target file name, block size, and next block number is stored in order to extend the amount of time between a pause and subsequent resume. By saving the information, the copy operation can be terminated and resumed at a later time (e.g., following a system restart) without having, to re-copy data that was previously copied.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
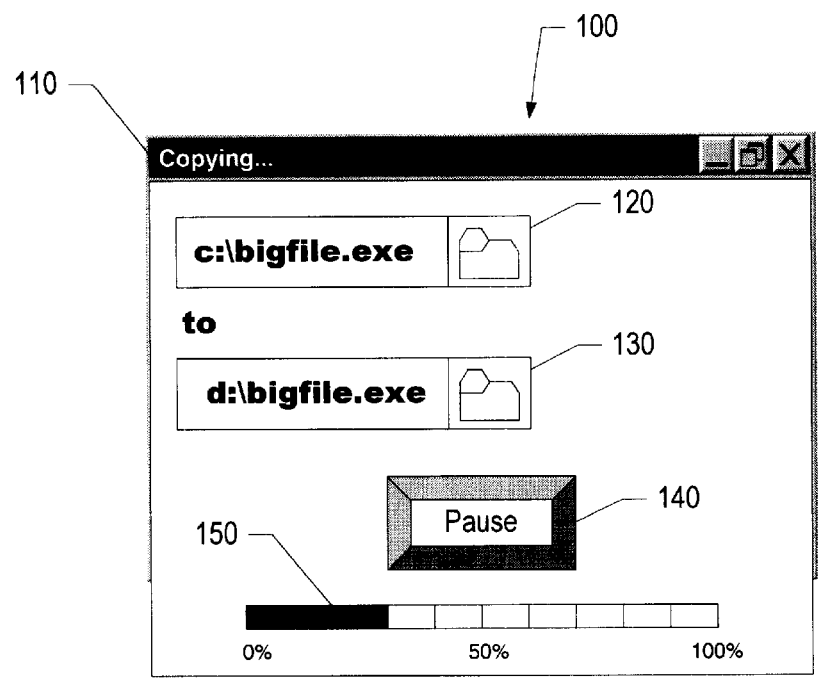
FIG. 1a is a pictorial representation of a user interface screen with a pause button.

With a reference now to the figures in particular with reference to FIG. 1a, there is illustrated an embodiment of a pause feature which may be utilized during a copy or move operation. As illustrated, dialog box 100 includes a title bar 110 showing that, copying is currently taking place. Dialog box 100 could be displayed on a variety of display devices. These devices include computer monitors, personal digital assistants (PDAs), cellular telephones, televisions connected to a computer or a computer network (e.g., WebTV™), and other information display devices. As shown, dialog box 100 includes a source file text box for entering the source file name 120 and a target file text box for entering the target file name 130. In FIG. 1a, source file 120 is being copied to target file 130. Source file 120 may be on a local computer system hard drive, ZIP™ drive, tape drive, floppy disk drive, nonvolatile memory, or any nonvolatile storage device connected to the computer system; a mainframe computer system stored in a direct accessible storage device (DASD), a tape drive, or other nonvolatile storage device connected to a mainframe computer system; a nonvolatile storage area within a PDA; stored in nonvolatile memory on a cellular telephone; or stored in any nonvolatile storage device connected to any information handling device. Target file 130 may reside on any of the devices that may store source file 120. Source file 120 and target file 130 need not be on the same type of device. For example, a source file stored on a personal computer system hard drive can be copied to a nonvolatile storage area in a PDA.

Pause command button 140 is shown enabled and visible to the user. The user may select pause command button 140 to pause the copy operation. Progress bar 150 shows the progress of the copy operation. In the example shown, source file 120 is "c:\bigfile.exe" and target file 130 is "d:\bigfile.exe.". Progress bar 150 shows that the copy process is approximately 30 percent complete. The copy operation is suspended when the user selects pause command button 140. Pause command button 140 may be selected by clicking on the button using a mouse or pointing device, or by using the keyboard.

Figure 1B:
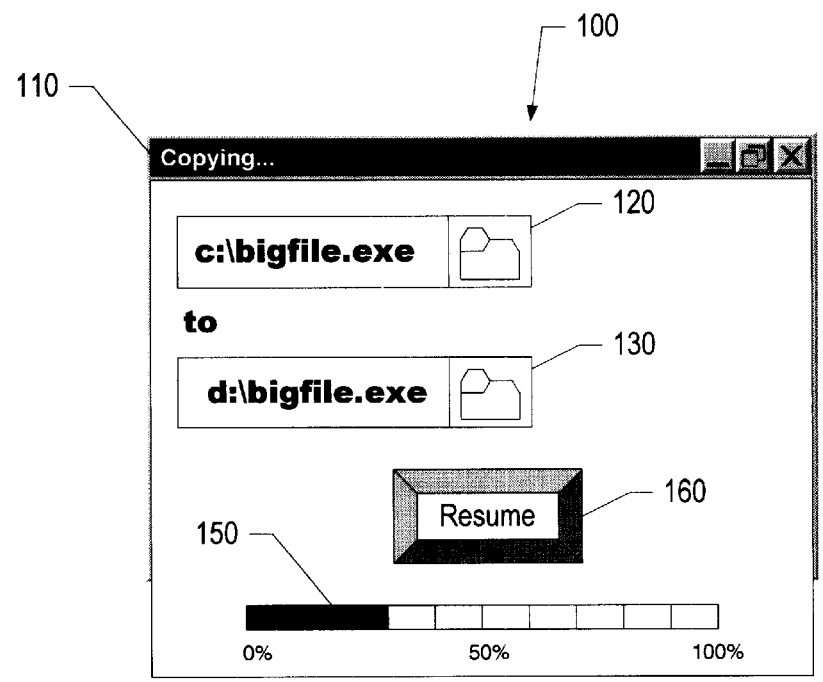
FIG. 1b is a pictorial representation of a user interface screen with a resume button.

FIG. 1b shows dialog box 100 as it is displayed to the user after the user has selected pause command button 140. Title bar 110 shows that the copy operation is currently paused. Source file 120 and target file 130 are shown, however, no data is currently being copied from source file 120 to target file 130. Progress bar 150 still shows the progress of the copy operation. Because the copy operation is paused, the shaded progress area within progress bar 150 will not move until the copy operation is resumed. Pause command button 140 (shown in FIG. 1a) has been replaced by resume command button 160. By clicking on resume command button 160, the user can resume the copy operation whereupon dialog box 100, as shown in FIG. 1a, is redisplayed, and the copying from source file 120 to target file 130 continues.

Figure 2:
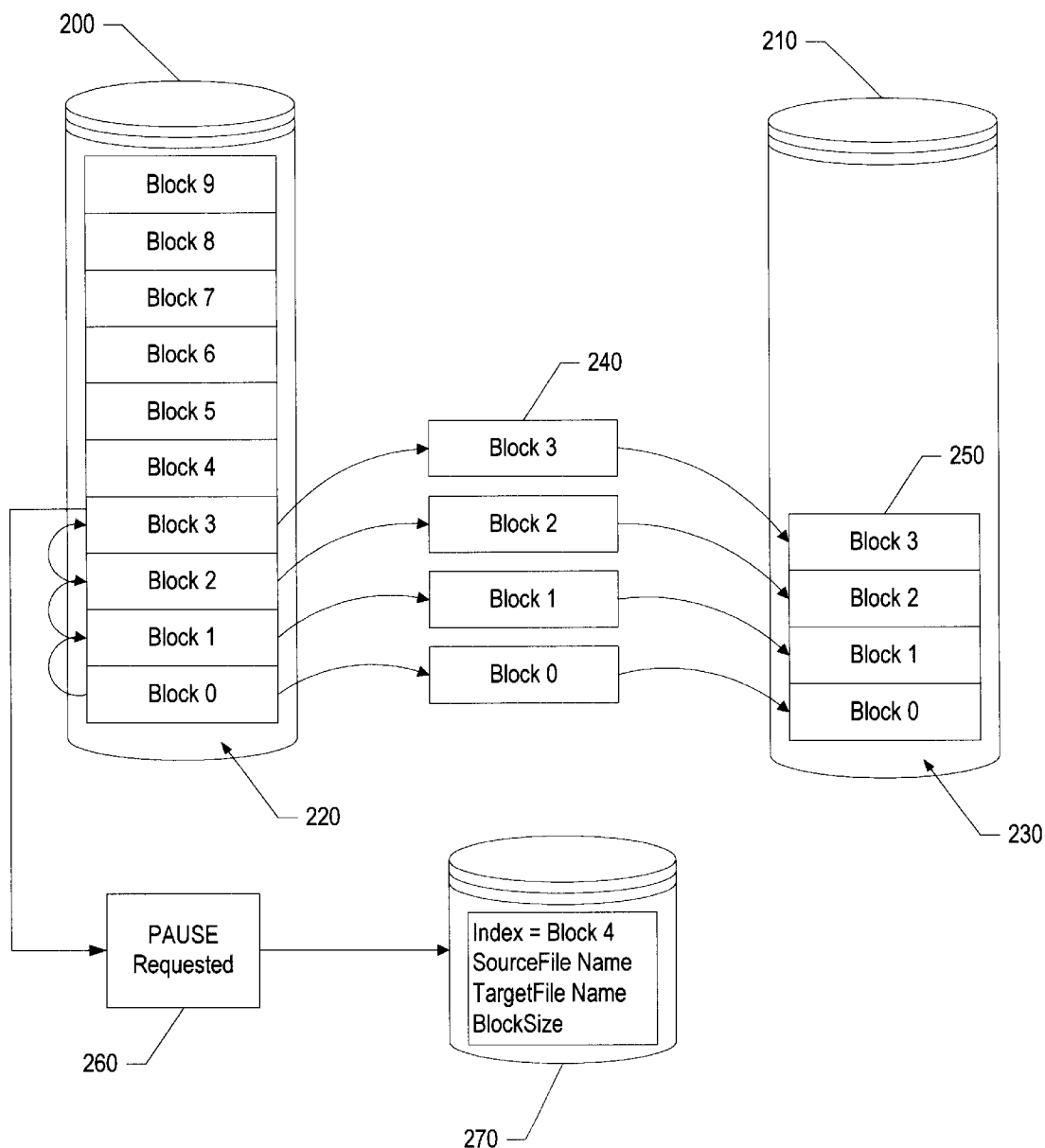
FIG. 2 is a block diagram of a pause request.

FIG. 2 is a block diagram depicting a copy operation being paused. Source file 220 is shown residing within nonvolatile storage device 200. Nonvolatile storage devices may include hard disk drives, optical drives, removable disks, nonvolatile memory, or any storage area where the contents are retained when main power has been removed. Source file 220 is shown as being broken down into a series of blocks, numbered 0 through 9. Blocking algorithms that may be used to break source file 220 into blocks are well known in the art. The algorithm and default block size used depends on whether the copy operation is being performed at an operating system level or by an application program. In addition, if source file 220 is being sent through a network, such as the Internet, the transmission speed between the source computer and target computer is taken into account. Faster transmission paths can handle larger block sizes efficiently, while slower transmission paths are more efficient using a smaller block size.

Files stored on the nonvolatile storage devices have a location. In FIG. 2, the files are shown occupying contiguous areas within nonvolatile storage devices 200 and 210 for simplicity. However, in actual systems the file location often points to the beginning address of the file structure. The file itself, may be stored in discontiguous areas across the nonvolatile storage device. Because of storage optimization and restrictions, a large file may be placed in several areas within the nonvolatile storage device. The operating system, or disk handling system, gathers the discontiguous areas and provides them to the requesting program. As used herein, the word location refers to the collective areas on which a file may reside within the nonvolatile storage device.

In FIG. 2, source file 220 is shown being copied to destination file 230 within destination nonvolatile storage device 210. Source file 220 is shown as being broken into multiple blocks. The block size is determined prior to the copy operation. During the copy process, processing reads bytes of data from source nonvolatile storage device 200 and transfers the blocks of data to destination nonvolatile storage device 210. The bytes of data are equal in size to the block size. In the example shown, Block 0 is first copied, followed by Block 1, Block 2, etc. After Block 3 240 is copied to destination nonvolatile storage device 210 as destination block 250, the copy operation is approximately 40 percent complete. At this point, however, the user has requested that the copy operation be paused. Pause request 260 suspends the reading of source file 220 and subsequent writing to destination file 230. By pausing the copy operation, the user frees resources, such as processing capacity and nonvolatile storage access, for use by other processes that the user wishes to execute. When pause request 260 occurs, index file 270 is created capturing the state of the copy operation at the time the pause was requested. Index file 270 can either be created in memory or as a file within a nonvolatile storage device. If the pause is going to be brief and the copying will resume before the user shuts down the computer system, index file 270 can be created in memory. However, if the copying will be resumed at a later time (e.g., after the user shuts down and reboots the computer system), index file 270 is created as a file on a nonvolatile storage device. Index file 270 keeps track of what was taking place during the copy operation before the operation was paused. In the example shown, index file 270 includes the index of the next block to be read from source file 220 and copied to destination file 230, the source file name, the destination file name, and the block size. It will be appreciated by those skilled in the art that optimal block sizes are determined by taking into account various factors, such as the type of media storing the source and target files, the operating system being used, and the speed of the transmission path. Also, it will be appreciated by those, skilled in the art that the pause feature described herein could be implemented as an extension to an operating system, or as an application software program invoked by the operating system.

Figure 3:
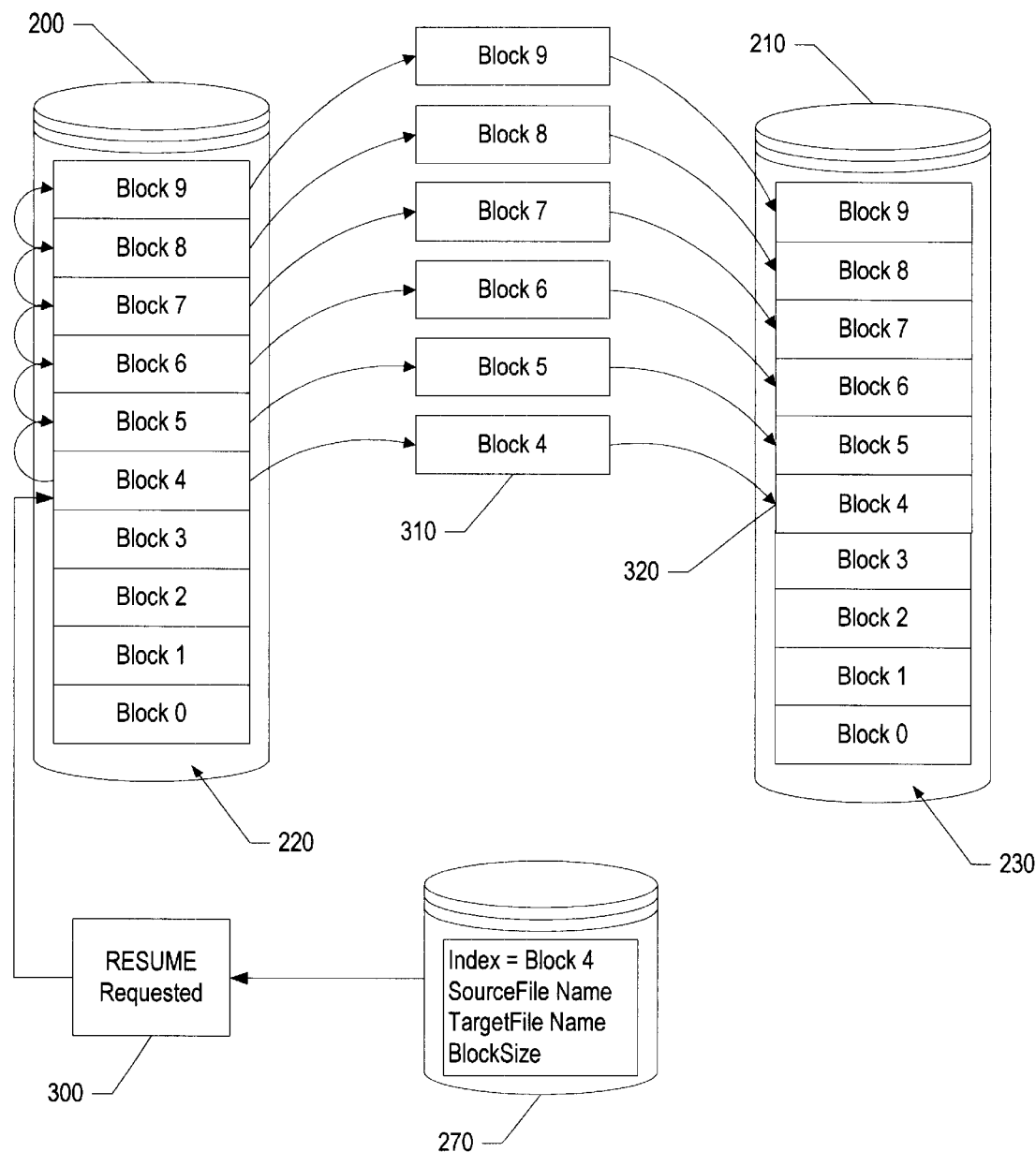
FIG. 3 is a block diagram of a resume request.

FIG. 3 is a block diagram of the processing that occurs when a subsequent resume request is received from the user. In FIG. 3, resume request 300 has been received. This request may have been received because the user selected resume command button 160. (see FIG. 1b). Upon receiving the resume request, the copy operation reads index file 270 to determine where copying should resume. Because the index points to Block 4, the copy operation resumes by reading Block 4 310 from source file 220 on source nonvolatile storage device 200, and writing, this block to destination file 230 stored on destination. nonvolatile storage device 210 as destination Block 320. Reading blocks from source file 220 and writing blocks to destination file 230 continues until the end of source file 220 is reached, or until another pause request is received from the user.

Figure 4A:
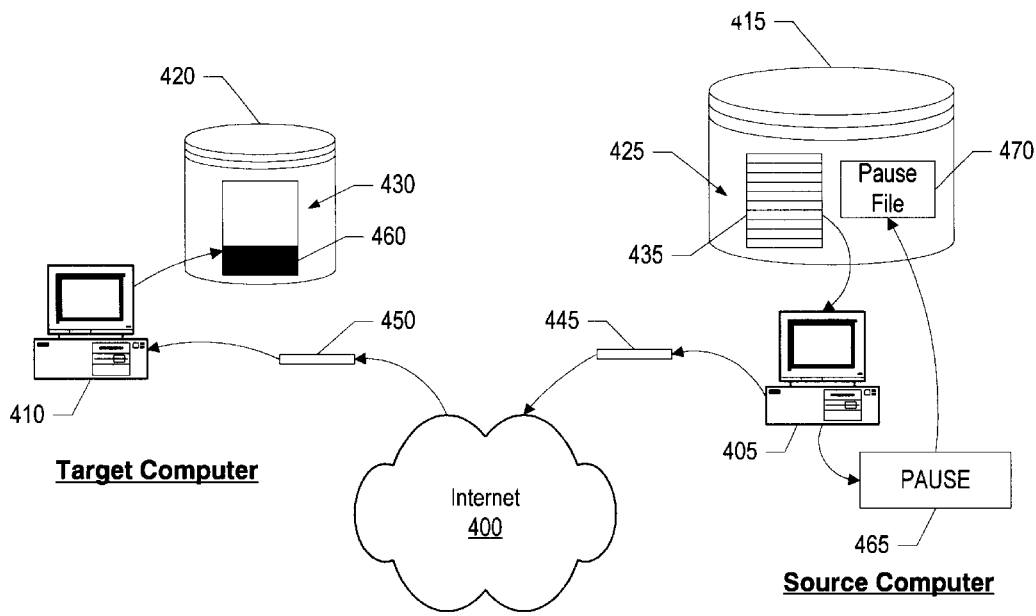
FIG. 4a is a block diagram of a pause request over a network.

FIG. 4a shows the pause operation taking place during a copy operation copying a file from one computer to another computer over a network such as the Internet. Internet 400 connects source computer 405 and target computer 410. Source computer 405 copies blocks from source file 425 stored on source nonvolatile storage device 415. As shown, Block 435 is read by source computer 405 and transmitted as Block 445 to the Internet 4000. Block 450 is received by destination computer 410 and appended to destination file 430. Destination file 430 is stored on destination nonvolatile storage device 420. Both source computer 405 and destination computer 410 are connected to the Internet. Computers can connect to the Internet in a variety of ways, including modems connected to an Internet service provider (ISP), cable modems, ISDN connections, DSL connections, satellites connections, as well as other means. While the Internet is shown, it is only one example of a computer network. Other computer networks that could be used in place of the Internet include local area networks (LANs), wide area networks (WANs), and any other network connecting two or more computers. At some point, the user of source computer 405 desired that the copy operation be paused so that computer resources could be freed to undertake other activities. Using a language that is executable on a variety of operating system platforms, such as JAVA, provides the advantage of using common programming code to implement the sending and receiving functions. The code on the receiving end simply appends the incoming data to the end of the target file so information about the block size are not necessary to perform the receiving operation. Once the end-of-file (EOF) character is received, the file is complete and the receive process closes the file.

In FIG. 4a the user requested that the copy operation be paused by selecting pause command button 140 (see FIG. 1a). Upon receiving pause request 465, the copy operation creates pause file 470. Pause file 470 includes index information (similar to index file 270 shown in FIGS. 2 in 3). As previously described, destination computer 410 does not need a copy of pause file 470 in order to function. However, the file being stored on destination computer 410 is incomplete until the copy operation is completed. Therefore, depending upon the type of file being transferred, it may be advantageous to inform the user of destination computer 410 that the copy operation was paused using email, screen message, or another type of message as is know by those of skill in the art. In addition, the address of destination computer 410 may be stored to facilitate restoring the network connection between source computer 405 and destination computer 410.

Figure 4B:
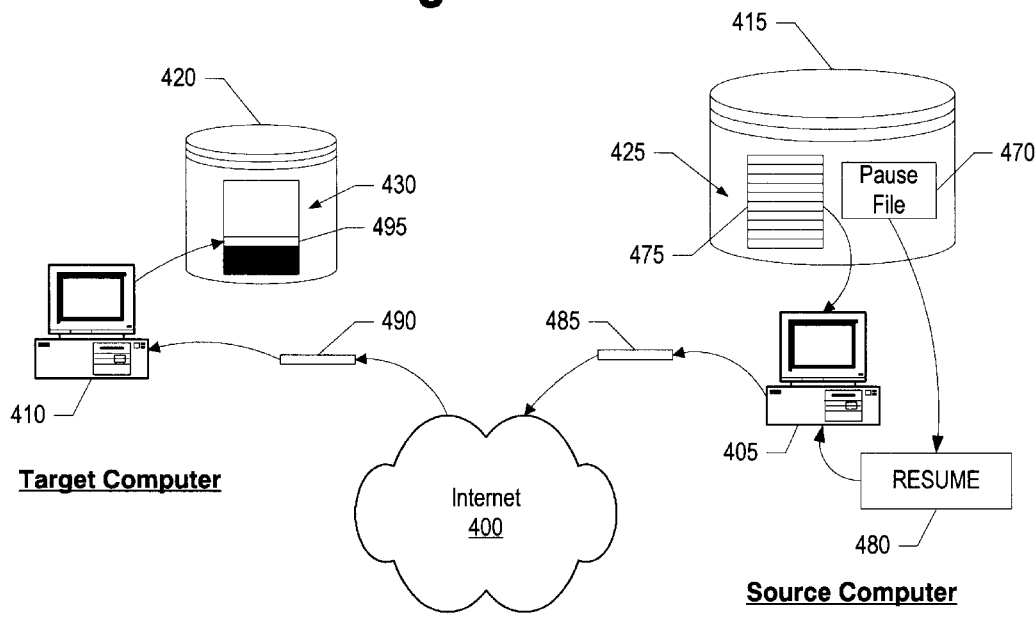
FIG. 4b is a block diagram of a resume request over a network.

FIG. 4b shows the resume process taking place subsequently to the pause operation shown in FIG. 4a. As shown, the user of source computer 405 requested that the copy operation be resumed. The user selected resume operation 480 by clicking on resume command button 160 (see FIG. 1b). At this point, pause file 470 is read to determine at what point the copy operation was paused. In the example shown, the index contained within pause file 470 indicates that the next block to be read is Block 475 within source file 425. Block 475 is read and transmitted as Block 485 to Internet 400. The block is transmitted through the network and is received as Block 490 at destination computer 410. Block 490 is appended to destination file 430 as Block 495. Subsequent blocks are then copied from source file 425, transmitted to destination computer 410, and appended to destination file 430 until either the end of source file 425 is reached or the user of source computer 405 requests another pause operation.

Figure 5:
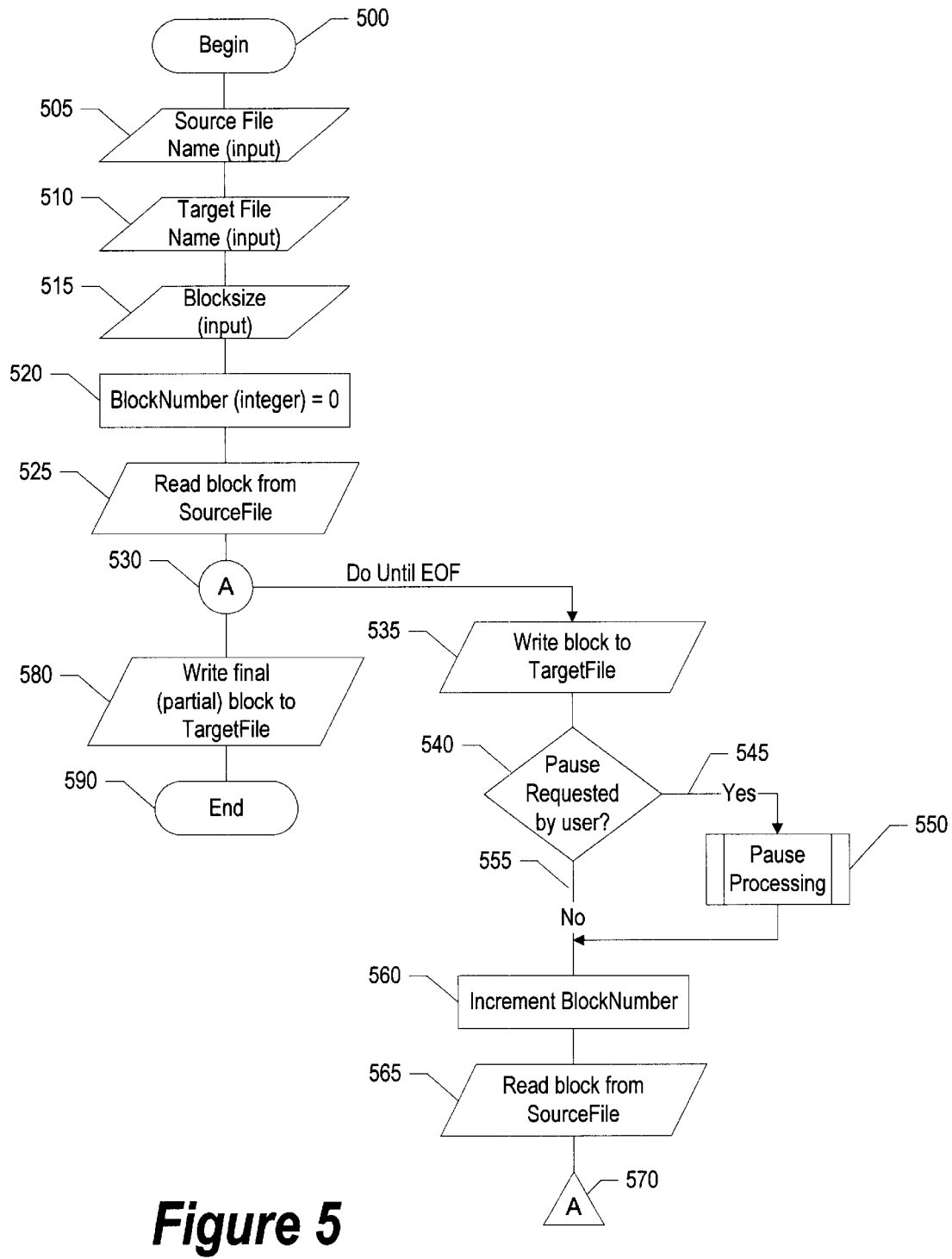
FIG. 5 is a flowchart showing the copying of a file using the pause feature.

FIG. 5 is a flowchart depicting a method of implementing the copy operation utilizing the pause feature. Processing commences (step 500) whereupon a source file name (input 505) and a target file name (input 510) are input to provide the move/copy program with the source and target files (including any address information, such as the file path information and destination computer address). A block size is also provided (input 515). The block size may be provided by the user (or the user may be provided with preset options such as "high," "medium," and "low"), or, in a preferred embodiment, is calculated to determine an optimal block size to use given the system constraints and the size of, the source file. System constraints may include whether the file is being transmitted over the Internet or the speed capabilities of the destination nonvolatile storage device. To determine an optimal size, the throughput is tested between the source file and target file. The higher the throughput, the greater the block size. Conversely, if the throughput is low (i.e. a slow Internet connection) then the block size is decreased accordingly.

In the flowchart shown in FIG. 5, the block number is initialized to zero (step 520) to keep track of the number of blocks read from the source file and written to the target file. An initialization read (input 525) reads the first block from the source file. Loop A (loop 530) begins a loop that will read the source file until the end of file is reached. Within loop A, each block read is written to the target file (output 535). Also within loop A, the program determines whether the user has requested to pause the copy operation (decision 540). If the user has requested to pause the copy operation, "yes" branch 545 is taken whereupon pause processing (subroutine 550) is executed (see FIG. 6). On the other hand, if the user did not request to pause the operation, the block number is incremented (step 560), and the next block is read from the source file (input 565). End of loop A is reached (loop end 570) and processing returns to the beginning of loop A at 530. When the end of file is reached, the final, or partial, block that was read in input 565 is written to the target file (output 580). At this point, the source and target files are closed and processing ends at termination 590.

Figure 6:
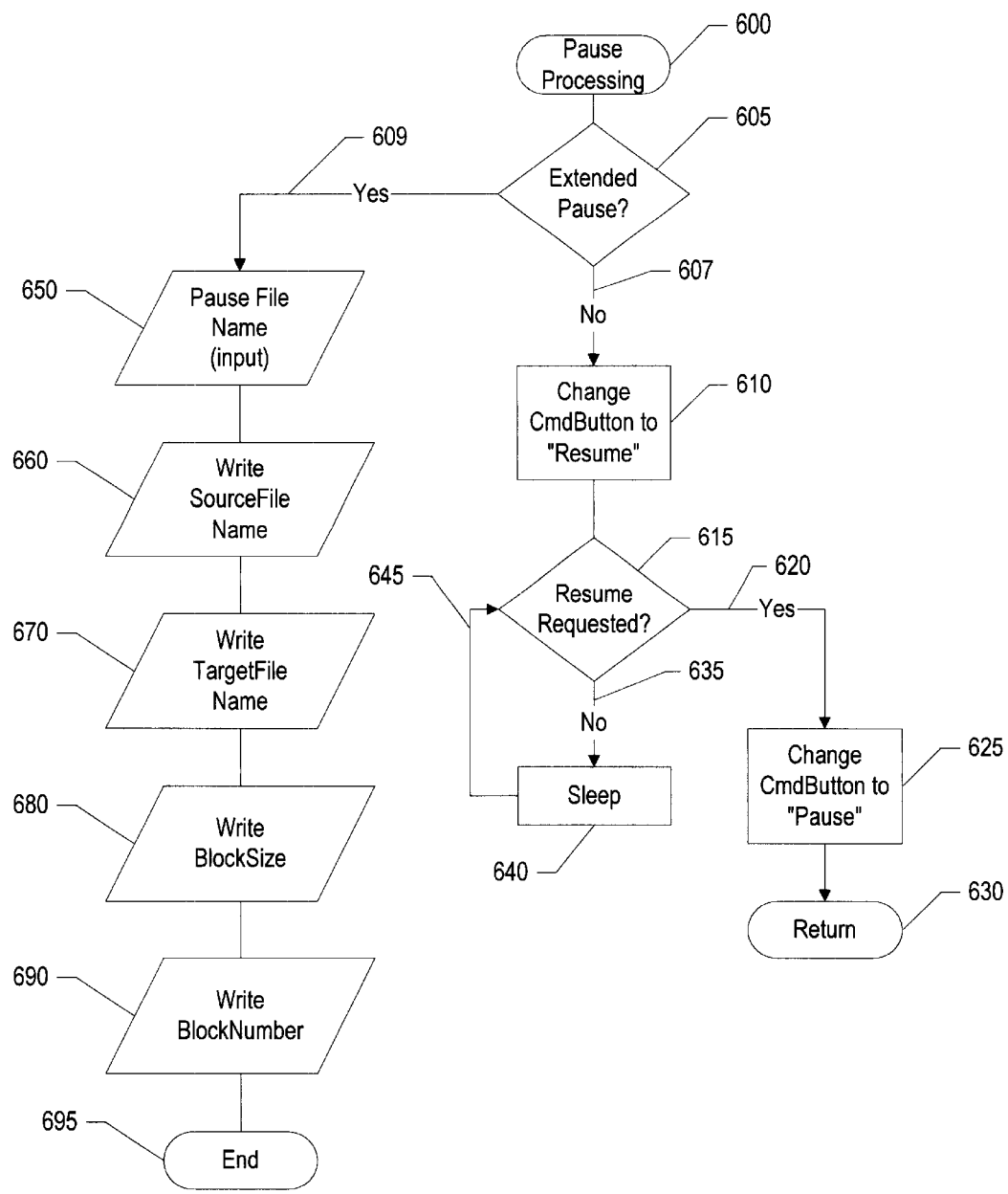
FIG. 6 is a flowchart showing pause processing.

FIG. 6 is a flowchart depicting a method for implementing pause processing 550 that would take place when the user requests to pause the copy operation. The user decides whether the pause will be an extended pause (i.e. the copy program will be closed and the computer system may. be re-booted prior to resuming the copy operation) or temporary (i.e. the copy program remains open and waits for the user to click on the resume command button 160 as shown in FIG. 1b). The decision can be received by the user as a check box field on dialog box 100 or as a dialog box appearing to the user after the user has selected to pause the copy operation. The program determines whether an extended pause is desired (decision 605). If an extended pause has been requested, "yes" branch 609 is taken leading to extended pause processing. If an extended pause, has not been requested, "no" branch 607 is taken to toggle the command button and wait until the user is ready to resume.

As shown in FIGS. 1*a* and 1*b,* the pause command button toggles to display "resume" after the user has requested to pause the operation. The command button is changed (step 610) to display the word "resume" rather than the word "pause" after the user has selected the pause command. The program determines whether the user has requested to resume the copy operation (decision 615). If the user has not requested to resume the copy operation, "no" branch 635 is taken and the operation sleeps for predetermined amount of time (step 640) before looping back (loop 645) to determine whether the user has requested to resume the copy operation (decision 615). If the user has requested to resume the copy operation, "yes" branch 620 is taken and the "resume" command button is changed back to the "pause" command button (step 625) before the routine returns to the copy operation (return 630). Notice that during a temporary pause operation, the next block index is not written to a nonvolatile storage device. This is because the main copy program is still in memory along with the next block number to be copied.

At the top of the flowchart shown in FIG. 6, if the user requested an extended pause, decision 605 would branch to "yes" branch 609 in order to save the state of the copy operation before exiting the copy program. For an extended pause, a pause file name is provided (input 650) so that the information can be stored until the copy program is re-invoked. The pause file name can be provided by the user through a dialog box or may be automatically generated by the copy operation. The source file name is written to the pause file (output 660). The target file name is also written to pause file (output 670). Both the source and target file names include full path descriptions so that the file can be located within a directory on the user's computer system or a computer system connected to the user's computer system through a computer network. The block size being used by the copy operation is also written to the pause file (output 680) as well as the block number currently being read and written by the copy operation (output 690). The pause file is then closed and the copy program is terminated at termination 695.

Figure 7:
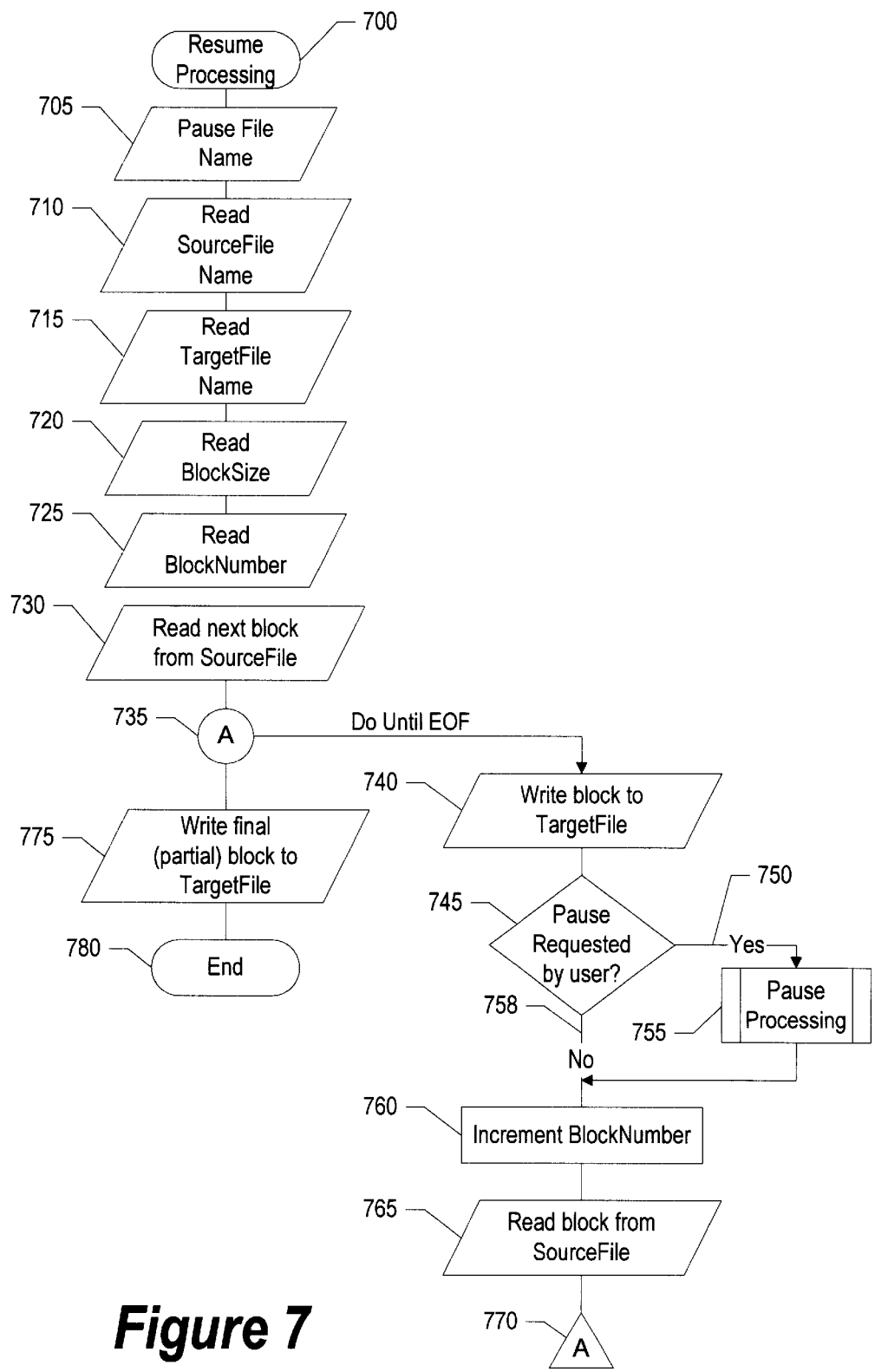
FIG. 7 is a flowchart showing resume processing.

FIG. 7 is a flowchart depicting a method for resuming the copy operation subsequent to an extended pause. The flowchart shown in FIG. 7 is similar to the method of implementing the copy operation utilizing the pause feature shown in FIG. 5. However, in FIG. 7, the information stored in the pause file is first read so that the copy operation can resume at the point where the previous copy operation was suspended. The routine commences at step 700. The pause filename is provided (input 705) through either a dialog box in which the user enters the pause filename, or by the copy operation automatically determining the correct pause file. The pause file is read to determine the source filename of the file being copied (input 710). The pause file is also read to determine the target filename of the destination file where the copied information is placed (input 715). The block size being used to copy the source file to the target file is also read from the pause file (input 720). The block number corresponding to the next block to be copied from the source file to the target file is also read from the pause, file (input 725). The block number is used so that the resume processing can commence at the correct block within the source file. The next block of data is read during an initialization read from the source file (input 730) before entering a loop to process the remaining information from the source file.

The processing beginning with Loop A (loop 735) is the same as the loop processing shown in FIG. 5 (loop 530). Loop A (loop begin 735) is commenced to process the source file until the end of the source file is reached. Each block read from the source file is written to the target file (output 740). The system determines whether another pause has been requested by the user (decision 745). If another pause has been requested by the user, "yes" branch 750 is taken and pause routine 755 is performed (see FIG. 6). If the pause has not been requested by the user, "no" branch 758 is taken and the block number is incremented (step 760). The next block is read from the source file (input 765) before the loop is closed at loop end 770. When the end of the source file has been reached, the final, or partial, block that was read from the source file is written to the target file (output 775). At the end of the resume processing routine, the source, target, and pause files are closed before processing is terminated at termination step 780.

Figure 8:
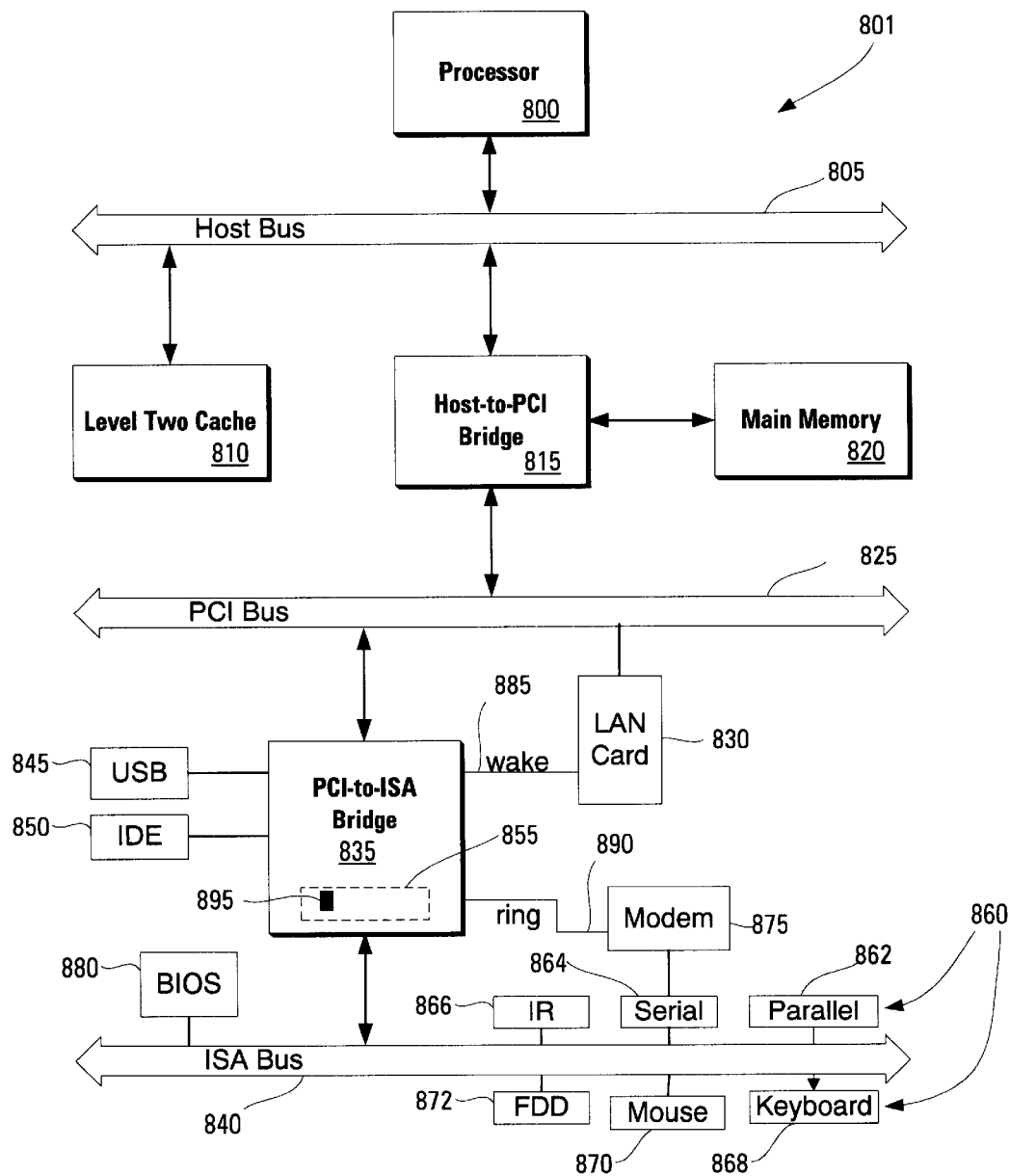
FIG. 8 is a block diagram of an information handling system.

FIG. 8 illustrates information handling system 801 which is a simplified example of a computer system capable of performing the copy processing described herein. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830 PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g. parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the copying processes described herein, this computer system is simply one example of a computer system. Those skilled in the art will appreciate that many other computer system designs are capable of performing the copying process described herein.

The present invention provides the user with opportunities not found before in the prior art. Being able to temporarily suspend a move or copy operation so that other tasks can be readily performed provides the user with increased flexibility and efficiency in their computer operating environment.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual, use in a floppy disk drive), or downloaded via the Internet or other computer network. Thus, the present invention may be implemented as a computer program product for use in a computer and, furthermore, the computer medium which may embody the invention can include a transmission means. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and, modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for copying data from a source file to a target file on a computer system, said method comprising:
   reading a first data portion from the source file;
   writing the first data portion to the target file;
   pausing the copying in response to a user requesting a pause operation from a user interface, wherein the computer system is available for other processing operations following the pausing;
   reading a second data portion from the source file in response to the user requesting a resume operation; and
   writing the second data portion to the target file.

2. The method as described in claim 1 wherein the first and second data portions each include one or more blocks of data.

3. The method as described in claim 1 wherein the pausing further includes:
   writing an index to a storage area, the index including a pointer to the second data portion within the source file.

4. The method as described in claim 3 wherein the writing an index to a storage area further includes:
   writing a source file path name to the storage area; and
   writing a target file path to a storage area.

5. The method as described in claim 4 wherein the reading a second data portion further comprises:
   reading the index, source file path name, and target file path name from the storage area.

6. The method as described in claim 1 wherein the source file resides on a remote computer system and wherein the target file resides on the computer system, the method further comprising:
   transmitting the first and second data portions across a computer network, the computer network connecting the remote computer system and the computer system.

7. The method as described in claim 1 further comprising:
   displaying an amount completed, the amount completed showing a total amount of data written to the target file.

8. The method as described in claim 1 further comprising:
   selecting a block size, the block size corresponding to the size of the first and second data portions.

9. The method as described in claim 8 wherein the selecting further includes:
   testing a transmission speed between a source file location corresponding with the source file and a target file location corresponding with the target file.

10. A computer system comprising:
    one or more processors;
    one or more nonvolatile storage devices accessible by the one or more processors, wherein the nonvolatile storage devices each include a plurality of locations for storing files;
    a data file stored at a first location on the nonvolatile storage device;
    a copy tool, the copy tool including:
      means for reading a first portion of the data file;
      means for writing the first portion to a new file, the new file located at a second location;
      means for pausing the copy tool in response to a user request from a user interface, wherein the computer system is available for other processing operations following the pausing;
      means for resuming the copy tool in response to a user request;
      means for reading a second portion of the data file in response to the resuming; and
      means for writing the second portion to the second location.

11. The computer system as described in claim 10 further comprising:
    a remote computer system and the computer system interconnected with a computer network, the remote computer system and the computer system each including a nonvolatile storage device, one or more processors, and a network interface, wherein the first location is included in the nonvolatile storage device connected to the remote computer system and wherein the second location is included in the nonvolatile storage device connected to the computer system; and
    means for transmitting the first and second portions from the remote computer system to the computer system.

12. The computer system as described in claim 10 wherein the means for pausing further includes:
    means for writing an index to a storage area, the index including a pointer to the second data portion within the data file.

13. The computer system as described in claim 10 wherein the means for resuming further includes:
    means for reading an index from a storage area, the index including a pointer to the second data portion within the data file.

14. The computer system as described in claim 10 further comprising:
   means for selecting a block size;
   wherein each of the means for reading includes means for reading one or more blocks; and
   wherein each of the means for writing includes means for writing one or more blocks.

15. The computer system as described in claim 14 wherein the selecting further includes testing a transmission speed between the first location and the second location.

16. A computer program product in a computer usable medium for copying data from a source file to a target file on a computer system, comprising:
   means for reading a first data portion from the source file;
   means for writing the first data portion to the target file;
   means for pausing the copying in response to a user requesting a pause operation from a user interface, wherein the computer system is available for other processing operations following the pausing;
   means for reading a second data portion from the source file in response to the user requesting a resume operation; and
   means for writing the second data portion to the target file.

17. The computer program product as described in claim 16 wherein the means for pausing further includes:
   means for writing an index to a storage area, the index including a pointer to the second data portion within the source file.

18. The computer program product as described in claim 16 wherein the source file resides on a remote computer system and wherein the target file resides on the computer system, the computer operable medium further comprising:
   means for transmitting the first and second data portions across a computer network, the computer network connecting the remote computer system and the computer system.

19. The computer program product as described in claim 16 further comprising:
   means for selecting a block size, the block size corresponding to the size of the first and second data portions.

* * * * *